April 29, 1952 S. N. VAN VOORHIS 2,594,870
INDICATOR
Filed Nov. 29, 1945

INVENTOR
STANLEY N. VANVOORHIS

BY
ATTORNEY

Patented Apr. 29, 1952

2,594,870

UNITED STATES PATENT OFFICE 2,594,870

INDICATOR

Stanley N. Van Voorhis, Rochester, N. Y., assignor, by mesne assignments, to the United States of America as represented by the Secretary of the Navy Application November 29, 1945, Serial No. 631,756

3 Claims. (Cl. 315—22)

This invention relates to a circuit for improving target contrast effect on an intensity modulated cathode ray tube, and particularly on such a tube as used in radar presentation.

It is well known to those versed in the art that the amount of reflected energy from an object detected by a radar system is dependent on the nature of the surface and the material of the object. This in turn means that the received echo collected by the receiver antenna will vary over a wide range of amplitude which might be preserved in the output of the receiver and applied as intensity modulation to the cathode ray tube. However, it is a well known property of cathode ray tubes that they are unable to accept such wide ranges of input signals, and it has therefore been the previous practice to limit sharply the amplitude of the output signals from the receiver. A value of input signal that will just produce this limited output is an important parameter of such a system.

Input signals less than this will produce an output less than the limiting value, which becomes larger as the input signal increases up to the critical value. Input signals larger than this critical value produce an output which is constant at the limiting level and is independent of the amplitude of the input signal. It has been the custom to adjust the receiver so that this critical value of input signal corresponds approximately to the echo return from land areas. Accordingly, built up areas which give a larger echo return do not produce a larger output from the receiver and are not differentiated in brightness on the cathode ray tube. It is also known that the eye is unable to well distinguish between close shades of gray, and that a gradual blending of gray into white is not perceivable. Therefore, it is desirable to produce a condition whereby built up areas appear substantially as one shade which may be called white, ordinary land without buildings appear substantially as another shade which may be called gray, and water areas appear substantially black.

To cause water to appear as black, ground clutter as gray, and better reflecting surfaces such as buildings, ships and built up areas as white, it is necessary to review their reflecting properties with regard to reflected signal strength. Bodies of water such as lakes and rivers with flat surfaces offer comparatively small amounts of reflected energy, ground surfaces with their irregularities offer more reflected energy, while buildings, ships and built up areas having more vertical reflecting surfaces, offer a maximum amount of reflected energy to a receiving device.

It is also known in the art that a receiving device consisting of a detector or rectifier and a means of amplification, will for sufficiently small input signals, obey a square law characteristic in which the current output from the receiving device is proportional to the square of the applied signal input voltage. For higher input signals the output may be made to approach a linear characteristic in which the output current is proportional to the first power of the applied signal input voltage. In accordance with my invention, combining two such receiving devices, each of which may have an independently controlled gain and limiting output value, they can be caused to produce a stepped composite characteristic output curve. A desirable condition may be obtained in which the system would provide a medium output and high gain for signals corresponding to ordinary land areas, and at the same time provide a higher output and a lower gain for signals corresponding to built up areas.

It is accordingly an object of this invention to provide a radar system having a receiving gain characteristic and limiting output level which depends on the type of target.

It is another object of this invention to provide a three tone presentation on the screen of an intensity modulated cathode ray tube.

Another object of this invention is to provide a three tone presentation in which water will appear black, ground clutter will appear gray, and towns, buildings or built up areas will appear white.

Another object of this invention is to provide a controllable three tone presentation on an intensity modulated cathode ray tube.

Another object of this invention is to provide means for a better discrimination of targets.

Other and further objects will be apparent upon consideration of the following description together with the accompanying drawing, in which.

Figure 1:
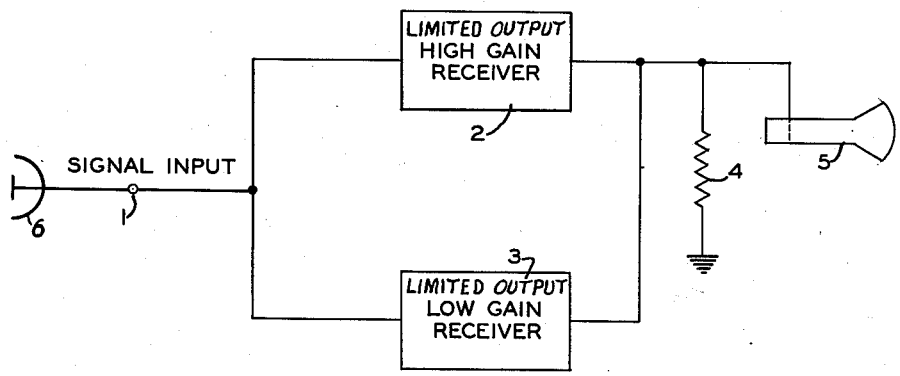
Fig. 1 shows generally a block diagram of an embodiment of said invention.

In Fig. 1 a reflected energy signal is taken from a directional antenna 6 or other collecting device and applied to terminal 1, and then simultaneously to a high gain receiver 2 and a low gain receiver 3. This input signal is amplified in each receiver according to its own characteristic and the video output signals are additively combined across resistor 4 and applied to a cathode ray tube 5 to modulate the intensity of the electron beam therein.

Figure 2:
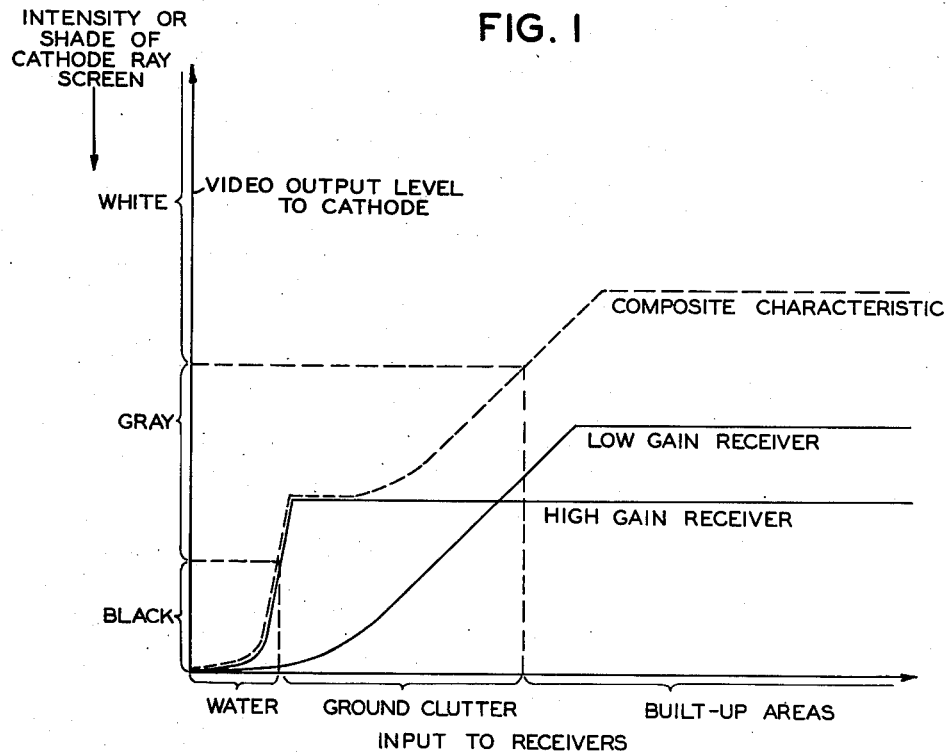
Fig. 2 shows a graph of certain operating characteristics of the embodiment disclosed in Fig. 1.

Fig. 2 shows the gain characteristics of each receiver and a composite characteristic curve. On the vertical axis, which corresponds to the amplitude of the video signal output, are shown the shades that will appear on the cathode ray tube with various amplification and video levels. On the horizontal axis, which corresponds to the amplitude of the reflected signal input, are grouped types of targets in the order of their ability to reflect useful amounts of energy. In this embodiment of the invention it is desired that black areas represent targets of low reflecting ability, that gray areas represent targets with better reflecting properties, while the white areas represent those targets returning a maximum amount of energy.

In Fig. 2, it is shown that a signal of low input strength, corresponding to the reflection from a water area, will cause both receivers to operate in their square law region and produce a very small output which will correspond to black on the cathode ray tube. A somewhat larger input signal, corresponding to a reflection from ordinary land areas, will still be in the square law region for the low gain receiver but will reach the limiting level for the high gain receiver. Accordingly, the combined output for such a signal will be largely due to the action of the high gain receiver, and all signals of approximately this strength will have an output which will correspond to gray on the tube screen. A still larger input signal corresponding to that from a built up area will be sufficient to cause both receivers to operate at their limit levels, thus producing a larger output voltage which corresponds to white on the screen.

The additively combined outputs of the two receivers, therefore, produces a highly desired stepped composite characteristic curve which is as shown by the dashed line. From examination of this composite curve it will be noted that the two receivers have been adjusted in such a manner that the combined square law operating regions, the amplification, and the video output levels, cause varied targets to illuminate the cathode ray tube in proportion to their ability to reflect back useful amounts of signal energy.

It thus becomes apparent that low input signals such as are reflected from water will cause only enough video output to place them in the black intensity area. Ground clutter offers more input signal strength and produces enough video output to intensify the cathode ray tube into the gray area. Structural type targets offer still more input signal strength, and hence greater video output, and will intensify the cathode ray tube into the white area.

Thus by making operating adjustments on the receivers to adapt them to any local conditions encountered, an effective three tone presentation may be made to appear on any intensity modulated cathode ray tube.

The invention is only to be limited by the appended claims.

What is claimed is:

1. An electric circuit comprising in combination, a cathode ray tube including a screen, a pair of receivers, means for simultaneously applying a signal to said pair of receivers having output amplitudes limited to predetermined levels, a device for additively combining the outputs of said pair of receivers, means for applying this additively combined output to said cathode ray tube to modulate the intensity of the electron beam in said tube, one of said receivers being a high gain device which amplifies low amplitude input signals and the other of said receivers being a low gain device giving but very little amplification to high amplitude input signals.

2. An electric circuit comprising in combination, a cathode ray tube including a screen, a pair of receivers, means for simultaneously applying a signal to said pair of receivers, a device for additively combining the outputs of said pair of receivers, means for applying this additively combined output to said cathode ray tube to modulate the intensity of the electron beam in said tube, one of said receivers being a high gain device which amplifies low amplitude input signals and having its output limited substantially to a point giving a representative gray intensity area on said screen, the other of said receivers being a low amplitude gain device giving but little amplification to low input signals and having its output limited substantially to a value which when added to the output of said high gain receiver will produce a representative white intensity area on said screen, the combined outputs of said two receivers having a stepped composite characteristic output curve dependent on the amplitude of the input signal to said receiving devices, said combined output illuminating the cathode ray tube screen into black, gray or white areas to cause a three tone presentation on said screen.

3. In a radio pulse-echo system for the detection of remote objects in which the amplitude of received echoes collected by the receiver antenna are indicative of the nature of the reflecting object, a display circuit comprising, in combination, a cathode ray tube including a screen, a pair of receivers, means for applying the echo signal collected by said antenna simultaneously to said receivers, a device for additively combining the outputs of said receivers, means for applying said additively combined output to said cathode ray tube to modulate the intensity of the electron beam in said tube, one of said receivers having a high gain responsive to amplify echo signals of an amplitude indicative of land to an output amplitude substantially giving a representative gray intensity area on said screen, the other of said receivers having a low gain responsive only to echo signals of an amplitude indicative of built-up areas and having the amplitude of its output limited substantially to a value which, when added to the output of said high gain receiver will produce a representative white intensity area on said screen, the combined outputs of said two receivers having a stepped composite characteristic output curve dependent on the amplitude of said received echo signal applied to said receivers, said combined output illuminating said cathode ray tube into black, gray, or white areas to cause a three-tone presentation on said screen indicative of water, land, or built-up areas, respectively.

STANLEY N. VAN VOORHIS.

REFERENCES CITED

The following references are of record in the file of this patent:

UNITED STATES PATENTS

| Number | Name | Date |
|---|---|---|
| 2,243,599 | Herbst | May 27, 1941 |
| 2,247,512 | Lewis | July 1, 1941 |
| 2,255,691 | Wilson | Sept. 9, 1941 |
| 2,292,045 | Burnett | Aug. 4, 1942 |
| 2,395,966 | Goldberg | Mar. 5, 1946 |